United States Patent
Baker

(10) Patent No.: US 8,653,935 B2
(45) Date of Patent: Feb. 18, 2014

(54) LOW-POWER WIRELESS NETWORK BEACON FOR TURNING OFF AND ON FLUORESCENT LAMPS

(75) Inventor: Murray C. Baker, Vancouver (CA)

(73) Assignee: IXYS CH GmbH (CH)

( * ) Notice: Subject to any disclaimer, the term of this patent is extended or adjusted under 35 U.S.C. 154(b) by 657 days.

(21) Appl. No.: 12/587,062

(22) Filed: Sep. 30, 2009

(65) Prior Publication Data

US 2011/0074623 A1  Mar. 31, 2011

(51) Int. Cl.
*G01S 13/88* (2006.01)

(52) U.S. Cl.
USPC .............................. 340/3.2; 455/41.2; 370/350

(58) Field of Classification Search
USPC ........ 340/418, 539.22, 540, 3.2; 315/294, 34; 370/336, 350; 324/754.23; 700/286; 455/41.2; 342/418; 710/10; 379/406.08
See application file for complete search history.

(56) References Cited

U.S. PATENT DOCUMENTS

| | | | |
|---|---|---|---|
| 6,538,568 B2 * | 3/2003 | Conley, III | 340/540 |
| 6,859,644 B2 | 2/2005 | Wang | 455/159.2 |
| 7,307,542 B1 | 12/2007 | Chandler et al. | 340/825.52 |
| 7,355,419 B2 * | 4/2008 | McDowell et al. | 324/754.23 |
| 7,379,791 B2 * | 5/2008 | Tamarkin et al. | 700/286 |
| 7,446,671 B2 | 11/2008 | Giannopoulos et al. | 340/825.72 |
| 7,548,203 B2 * | 6/2009 | Kalliola et al. | 342/418 |
| 7,554,274 B2 | 6/2009 | Wang et al. | 315/317 |
| 7,573,865 B2 * | 8/2009 | Shvodian | 370/350 |
| 8,184,674 B2 * | 5/2012 | Pope | 375/138 |
| 2004/0239263 A1 | 12/2004 | Vakil et al. | 315/291 |
| 2005/0064818 A1 * | 3/2005 | Assarsson et al. | 455/41.2 |
| 2005/0195968 A1 * | 9/2005 | Park et al. | 379/406.08 |
| 2006/0044152 A1 | 3/2006 | Wang | 340/825 |
| 2007/0252528 A1 * | 11/2007 | Vermuelen et al. | 315/34 |
| 2008/0031199 A1 * | 2/2008 | Park et al. | 370/336 |
| 2008/0068156 A1 * | 3/2008 | Shimokawa et al. | 340/539.22 |
| 2008/0130566 A1 | 6/2008 | Kwon | 370/329 |
| 2008/0211427 A1 * | 9/2008 | Budde et al. | 315/294 |
| 2009/0026966 A1 | 1/2009 | Budde et al. | 315/152 |
| 2009/0213816 A1 | 8/2009 | Guo et al. | 370/336 |

OTHER PUBLICATIONS

Sinem Coleri Ergen, "ZigBee/IEEE 802.15.14 Summary", Sep. 10, 2004, pp. 1-35.

(Continued)

*Primary Examiner* — Steven Lim
*Assistant Examiner* — Kaleria Knox
(74) *Attorney, Agent, or Firm* — Imperium Patent Works; T. Lester Wallace; Darien K. Wallace

(57) ABSTRACT

A low-power wireless network involves a plurality of RF-enabled fluorescent lamp starter units. In each of a plurality of intervals, a receiver of a starter unit operates in a receive mode during a beacon slot time, and for the majority of the rest of the interval operates in a low-power sleep mode. The starter unit wakes up and listens for a beacon each beacon slot time, regardless of whether a beacon is transmitted during that interval or not. A starter unit can be commanded to schedule a future action (for example, for a time between widely spaced synchronizing beacons) by making one of the beacons a scheduling beacon. The scheduling beacon includes a field that the starter unit uses to schedule the future action. If the scheduled action is to be canceled before the next widely spaced synchronizing beacon, then an action-canceling beacon is communicated in the next interval.

15 Claims, 12 Drawing Sheets

(56) References Cited

OTHER PUBLICATIONS

Mikhail Galeev, "Embedded Systems Programming: Will Bluetooth, ZigBee, and 802.11 all have a place in your home? Here's what ZigBee offers for home wireless networking", Apr. 20, 2004, pp. 1-6.
Dan Strassberg, "Simple networks will free many sensors from wires", Apr. 13, 2006, pp. 2-3.
G. Bhatti, A. Mehta, Z. Sahinoglu, J. Zhang, and R. Viswanathan, "Modified Beacon-Enabled IEEE 802.15.4 MAC for Lower Latency", Apr. 2009, pp. 1-6.
Jeffrey Z. Tao, Shivendra S. Panwar, Daqing Gu, Jinyun Zhang, "Performance Analysis for the IEEE 802.15.4 Contention Access Period", downloaded Sep. 2009, pp. 2-19.
Atmel Corporation, "ATAVRFBKIT/EVLB001 Dimmable Fluorescent Ballast User Guide", Oct. 2007, pp. 1-32.
Bob Nelson and Chris Marshall, "Request for Specification Input (RSI) Technical Requirements Document", Apr. 26, 2000, pp. 2-19.
Patrick Kinney, "ZigBee Technology: Wireless Control that Simply Works", Oct. 2, 2003, pp. 2-21.
Bob Heile, "Wireless Sensors and Control Networks: Enabling New Opportunities with ZigBee", Dec. 2006, pp. 2-52.
Royal Philips Electronics, Samsung Electronics Co., Ltd., Sony Corporation and ZigBee Alliance, "Zigbee and RF4CE Set New Course for Consumer Electronic Remote Controls", Mar. 3, 2009, pp. 1-3.
Bo Gao and Chen He, "An Individual Beacon Order Adaptation Algorithm for IEEE 802.15.4 Networks", May 2008, pp. 12-16.
Francis Rubenstein, "After DALI: A Look at What's Next", Jan. 16, 2005, pp. 3-4.
Dali Specification Guide, downloaded Sep. 2009, pp. 5-71.
Daintree Networks, "Introducing ZigBee RF4CE", Apr. 2009, pp. 1-4.
Module: ZigBee Overview, downloaded Sep. 2009, pp. 1-34.
Yao-Jung Wen, "Wireless Sensor and Actuator Networks for Lighting Energy Efficiency and User Satisfaction", Fall 2008, pp. 1-261.
Liang Cheng, "IEEE 802.15.4 MAC Protocol Study and Improvement", Dec. 2007, pp. 1-86.
The European Search Report dated Mar. 6, 2013 in the related foreign application EP10174708.7 that claims priority to the above-referenced application (11 pages).

* cited by examiner

| 2 | 2 | 1 | 2 | 2 | 1 | 1 | 1 | 2 | 1 | 2 |
|---|---|---|---|---|---|---|---|---|---|---|
| SOF | NID | LEN | DST | SRC | FTY | CUA | CMD | CTA | DAT | EOF |

BEACON

FIG. 2

| ABBR. | FIELD | BYTES |
|---|---|---|
| SOF | START OF FRAME | 2 |
| NID | NETWORK ID | 2 |
| LEN | LENGTH OF FOLLOWING FIELDS UNTIL EOF | 1 |
| DST | DESTINATION ADDRESS (GROUP ADD OF UNITS TO RECEIVE THE BEACON) | 2 |
| SRC | SOURCE ADDRESS (ADD OF MASTER THAT TRANSMITTED THE BEACON) | 2 |
| FTY | FRAME TYPE | 1 |
| CUA | COUNT UNTIL ACTION | 1 |
| CMD | COMMAND<br>00000001 = LAMP ON<br>00000010 = LAMP OFF<br>00000011 = PUT INTO REGISTRATION MODE<br>00000100 = STATUS REQUEST | 1 |
| CTA | COMMAND TARGET ADDRESS (UNIT TO RESPOND TO THE COMMAND) | 2 |
| DAT | DATA (E.G. INTENSITY) | N |
| EOF | END OF FRAME (CRC CHECK) | 2 |

160 US IS REQUIRED TO TRANSMIT EACH BYTE AT 50 KBPS
MINIMUM BEACON IS 17 BYTES AND REQUIRES 2.72 MS TO TRANSMIT

BEACON

FIG. 3

ONE 800 MS INTERVAL

NEIGHBORING SUB-NETWORKS
SYNCHRONIZED BY GROUP MASTER

STATUS REQUEST

SYNCHRONIZATION MODE

INITIAL CONDITION

PREHEATING

HIGH VOLTAGE

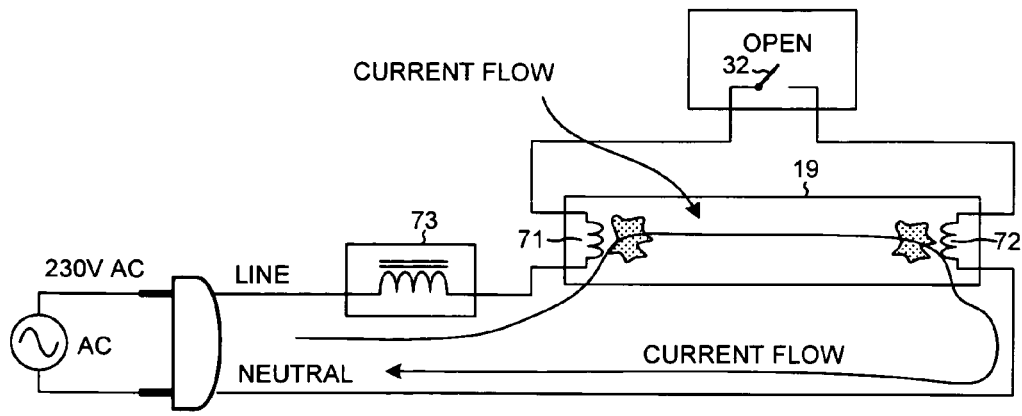
FIG. 16 — IGNITION AND USAGE
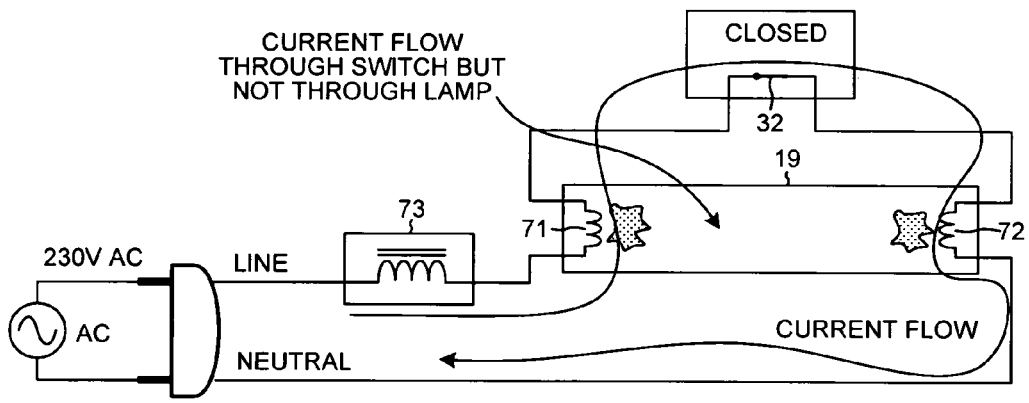
FIG. 17 — TURN OFF - STEP ONE
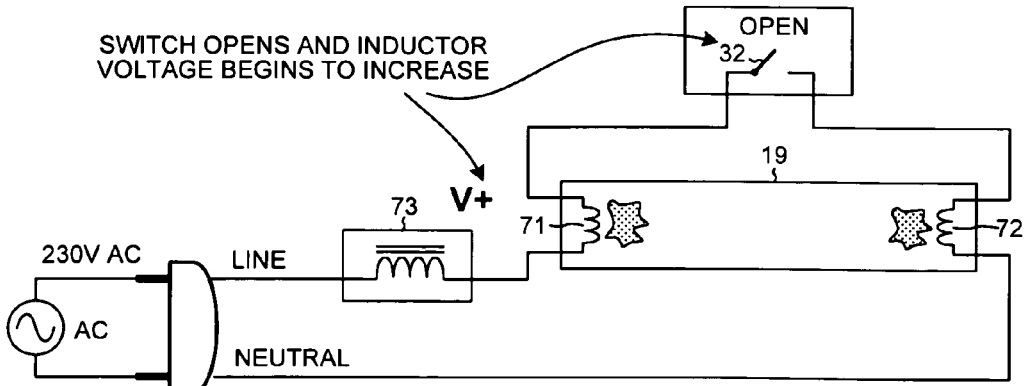
FIG. 18 — TURN OFF - STEP TWO

TURN OFF - STEP THREE

TURN OFF COMPLETE

A FIRST BEACON SCHEDULES A FUTURE ACTION AND A
SECOND BEACON CANCELS THE SCHEDULED FUTURE ACTION

LOW-POWER WIRELESS NETWORK BEACON FOR TURNING OFF AND ON FLUORESCENT LAMPS

TECHNICAL FIELD

The described embodiments relate to low-power wireless networks, and more particularly to a low-power wireless network involving RF-enabled fluorescent lamp starter units that are controlled by a battery-powered occupancy detector.

BACKGROUND INFORMATION

Many wireless protocols and systems have been used or have been proposed for use in controlling lighting systems. Some of these protocols and systems include IEEE 802.11 Wi-Fi, Bluetooth, X10, Z-Wave, INSTEON, nanoNET and ZigBee. Each of these protocols has its advantages and disadvantages. In one proposed ZigBee-based lighting control system, a central device referred to as the coordinator communicates wirelessly with multiple endpoint devices in a star topology. Each endpoint device is a Reduced Function Device (RFD) that is embedded in a lighting fixture. The central coordinator, on the other hand, is a Full Function Device (FFD) that can be made to turn on and to turn off the lighting fixtures by sending Radio Frequency (RF) communications to the endpoint devices. The coordinator and each of the endpoints realizes a ZigBee protocol stack. The first two layers of the ZigBee stack, the physical layer (PHY) and medium access control layer (MAC), are defined by the IEEE 802.15.4 networking standard. Two higher layers of the ZigBee stack, the network layer (NWK) and the application support sub-layer (APS), are specified by the ZigBee standard. User-defined application device objects (ZDO), along with the APS sub-layer, together constitute the application layer (APL) of the ZigBee stack. Additional information on the ZigBee stack can be obtained from The ZigBee Alliance, 2400 Camino Ramon, Suite 375, San Ramon, Calif. 94583, www.zigbee.org.

An endpoint device of the ZigBee-based lighting system receives a RF communication from the coordinator, decodes a command in the communication, and in response to a command in the communication turns on or turns off the light of the light fixtures. The system is "beacon enabled" in that the coordinator periodically transmits synchronizing frames referred to as beacons. The format of the beacons is defined by IEEE 802.15.4. The beacons are transmitted at widely spaced intervals, and between the times of the beacon transmissions the coordinator can spend much of its time in a low-power sleep mode. The endpoint devices receive the beacons and use the beacons to synchronize themselves to the beacon intervals such that the endpoint devices are in a low-power sleep mode at the same time that the coordinator is in the low-power sleep mode. The endpoints are able to wake-up and to enable their receivers synchronously with respect to the coordinator such that when the beacons are transmitted, the receivers of the endpoints are active. After receipt of a beacon, the endpoints turn off their RF transceivers and put themselves back into the low-power sleep mode of operation. It is the NWK layer of the ZigBee stack that manages this synchronization to beacons. Because the relative amount of time the coordinator and the endpoints are active and communicating is much smaller than the amount of time the coordinator and endpoints are in their sleep modes, overall power consumption of the devices is small.

Although such a ZigBee-based lighting control system has many advantages, it does involve an amount of protocol overhead. Supporting unnecessary aspects of the protocol may result in an undesirably large amount of power consumption. In addition, the beaconing period determines the latency between commands and this latency affects the responsiveness of the system to external stimulus. A low latency system dictates a short beacon periods which increases power consumption. Moreover, realizing a full ZigBee stack in a coordinator often requires more than 20 k bytes of memory. Realizing the ZigBee lighting control system can therefore be undesirably expensive. For an extremely cost sensitive battery-powered lighting control application, a less expensive and lower power system is desired.

SUMMARY

A low-power wireless network involves a master unit and many endpoint units. The master unit transmits synchronizing Radio Frequency (RF) transmissions referred to as beacons at regular and predictable times. The endpoint units, which operate in a low-power sleep mode for most of the time, wake up at the appropriate times to receive the beacons. The endpoints use the beacons both to keep their wake up times synchronized with respect to times when the master unit transmits beacons as well as to receive commands and data from the master unit.

Operation time of the network can be considered to involve a sequence of time intervals. Such a time interval may, for example, be an 800 milliseconds (ms) interval. The interval is short enough to satisfy minimal acceptable command latency requirements. Within each such interval, at a predetermined location within the interval, is a "beacon slot time." If the master unit transmits a beacon, then it transmits that beacon during the beacon slot time of one of the intervals. In a normal operating mode, the master unit only transmits a beacon some multiple of the interval, say for example a beacon is transmitted once every 256 intervals. This low frequency of beacon transmission is adequate to keep the endpoint units properly synchronized to the beacon slot times. The low frequency of beacon transmission reduces power consumption of the master unit and of the entire network. When the endpoints are not communicating with the master unit, electronics of the endpoints is kept in a low-power sleep mode. Because the beacon is of very short duration, and because the endpoints can communicate with the master unit during a relatively small portion of the overall interval time, the endpoints operate in the low-power sleep mode for the majority of their operating time. Endpoints only make RF transmissions when specifically commanded to by a beacon.

In a first novel aspect, the beacon includes a Count Until Action (CUA) field and a Command Target Address (CTA) field. If the value in the CTA field identifies the endpoint as the intended target, then the endpoint uses the value in the CUA field to schedule a future initiation of an action. In one example, the action is determined by a value in a Command (CMD) field and parameters needed to implement the command are set forth in a Data (DAT) field. In one example, the endpoint is an RF-enabled fluorescent lamp starter unit, the action is a future turning off of a fluorescent lamp, and the master unit is an RF-enabled and battery-powered PIR occupancy detector. Receipt of the beacon causes the fluorescent lamp starter unit to schedule the future turning off of the fluorescent lamp for a delay time after the beacon, where the delay time is determined by the value in the CUA field. The value in the CUA field may, for example, be a number of 800 millisecond (ms) intervals. The value in the CUA field may also be a time stamp. Using this CUA field, the master unit can cause a particular fluorescent lamp starter unit to turn off its lamp at a scheduled later time without transmitting another beacon. The occupancy detector can continue to transmit beacons at the infrequent rate of one beacon every 3.41 minutes (256 800 ms intervals), but yet the occupancy detector can cause the addressed fluorescent lamp starter unit to turn off its light at a specified time between such widely spaced beacons or before the next beacon is transmitted.

In a second novel aspect, the master unit communicates information to an addressed endpoint with reduced latency by transmitting a beacon to the addressed endpoint in the next interval. In one example, the endpoint is a fluorescent lamp starter unit that has been scheduled to turn off its lamp at a future time as commanded by the CUA and CMD fields in a first beacon. The first beacon is one of a sequence of synchronizing beacons transmitted each 3.41 minutes. In this example, the master unit is an RF-enabled battery-powered occupancy detector. The occupancy detector, after having sent the first beacon to turn off the lamp (for example, due to no motion being detected by the occupancy detector for an adequately long amount of time), detects motion. The lamp therefore should not be turned off at the scheduled time despite the first beacon having scheduled the turn off. In this scenario, the occupancy detector cancels the scheduled future turning off of the lamp by transmitting a second beacon in the very next 800 ms interval. Because the fluorescent lamp starter unit wakes up and listens for a beacon during the beacon slot time of each 800 ms interval, the starter unit receives the second beacon during the next interval before the lamp has been turn off. The second beacon contains a command that resets the CUA counter of the starter unit, or otherwise cancels the scheduled turn off of the lamp.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a diagram of a beacon used in the system of FIG. 1.

FIG. 3 is table that describes the fields in the beacon of FIG. 2.

FIGS. 13-16 are diagrams that illustrate how one of the starter units of the system of FIG. 1 can turn on a fluorescent lamp.

FIGS. 17-20 are diagrams that illustrate how one of the starter units of the system of FIG. 1 can turn off a fluorescent lamp.

DETAILED DESCRIPTION

Reference will now be made in detail to background examples and some embodiments of the invention, examples of which are illustrated in the accompanying drawings.

Figure 1:
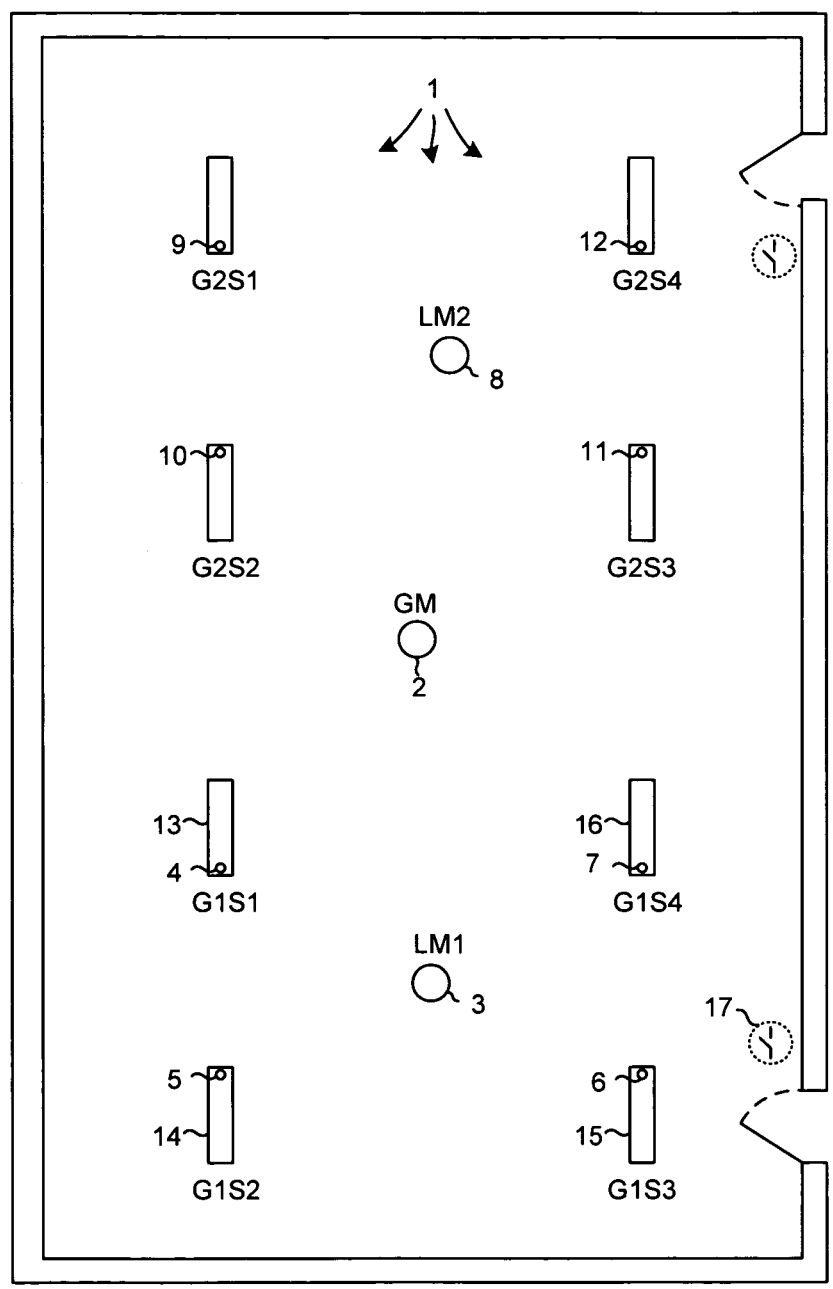
FIG. 1 is a simplified perspective diagram of a system 1 involving a group master unit and two sub-networks, where each sub-network includes a local master unit and multiple replaceable RF-enabled starter units. The group master unit and the local master units may be battery-powered PIR occupancy detectors.

FIG. 1 is a diagram of a low-power wireless radio frequency (RF) network 1 involving a general master unit (GM) 2, a first local master unit (LM1) 3, a first set of endpoint units (G1S1, G1S2, G1S3, G1S4) 4-7, a second local master unit (LM2) 8, a second set of endpoint units (G2S1, G2S2, G2S3, G2S4) 9-12. Each of the units 2-12 has a microcontroller-controlled RF transceiver. The RF transceiver is operable in a receive mode to receive RF communications from other units, or is usable in a transmit mode to transmit RF communication to other units. The RF transceiver can also be disabled and put into a low-power sleep mode. First local master unit 3 and the first set of endpoint units 4-7 are organized as a first sub-network having a star topology. Similarly, second local master unit 8 and the second set of endpoint units 9-12 are organized as a second sub-network having a star topology.

FIG. 2 is a schematic representation of an RF communication referred to here as a beacon. FIG. 3 is a table that sets forth the various fields of the beacon of FIG. 2. The bits of the beacon are transmitted from left to right in FIG. 2 such that the bits of the start of frame (SOF) field are transmitted first and such that the bits of the end of frame (EOF) are transmitted last.

The units of the system of FIG. 1 operate synchronously with respect to a stream of 800 millisecond (ms) intervals of time. Each 800 ms interval has a slot time in which the group master unit can transmit a beacon. In the system of FIG. 1, the group master unit 2 transmits a beacon in its beacon slot time in each 256th interval. A group master beacon is therefore transmitted once each 3.41 minutes. Although 5 ms is reserved for these group master unit beacon slot times, the time required to transmit a beacon at a data rate of 50 kbps is approximately 2.7 ms.

The local master units 3 and 8 use these beacons to synchronize when they wake up their RF transceivers and place the RF transceivers in receive mode. The synchronization occurs such that the RF transceivers of the local masters are in the receive mode during the beacon slot times so that if the group master transmits a beacon during the slot time, the local masters will receive the beacon. The local masters are synchronized to each other, and to the group master.

As illustrated in FIG. 2, each beacon includes, among other fields shown, an eight-bit command field CMD, a sixteen-bit source address field SRC, and a sixteen-bit command target address field CTA. If the command field includes an information request command value of 00000100, then the local master identified by the value in the CTA field is commanded to transmit information back to the group master. The group master that issued the information request beacon switches its RF transceiver from the transmit mode to the receive mode such that after transmission of the beacon the group master can receive the return communication from the addressed local master. The addressed local master switches its RF transceiver from the receive mode to the transmit mode and transmits the return communication back to the group master during a 5 ms period that starts at the end of the beacon slot time. Because the two local masters have different target addresses, the group master can cause a selected one of the local masters to transmit information back to the group master without the other local master transmitting and interfering with the communication. The group master can also then forward the information on to the other local master using the data portion (DAT) of a subsequent beacon. In this way, information can be communicated among and shared by the local master units and the group master unit. The amount of time during each 800 ms interval that the group master and the local masters communicate with one another is very small compared with the amount of time that group and local masters are not communicating. The local master units 3 and 8 do not transmit communications to the group master unit 2 unless first commanded to by the group master unit.

In the same way that the group master unit 2 sends synchronizing beacons to the local master units 3 and 8, so too does each of the local master units send synchronizing beacons to its respective endpoint units. The format of the synchronizing beacons sent by the local master units is the same as the format of the beacons sent by the group master unit and is as set forth in FIGS. 2 and 3. The endpoints of a sub-network use the synchronizing beacons from their local master unit to synchronize the times when their RF transceivers are in the receive mode. The RF transceivers of the endpoint units are made to be in the receive mode when beacons from their local master unit might occur. In one example, during each 256 800 ms intervals (3.41 minutes), there is a first time period during which the group master communicates with the local masters. This first time period includes a time period when the group master unit sends a beacon and also includes a subsequent time period when an addressed endpoint unit can communicate back to the group master unit. In addition to this first time period, there is a second time period during which first local master unit 3 communicates with the first set of endpoint units. This second time period includes a time period during which first local master 3 transmits a beacon and also includes a time period during which an endpoint unit can communicate back to the local master unit 3. In addition, there is a third time period during which the second local master 8 communicates with the second set of endpoint units. This third time period includes a time period during which second local master 8 transmits a beacon and also includes a time period during which an endpoint unit can communicate back to the local master unit 8. In the same way that the beacons transmitted from the group master unit can include an information request command that an identified local master return information back to the group master, so too can a local master unit include an information request command in a beacon so that an identified endpoint unit will return information back to the local master unit. The beacons and return information request communications are usable to communicate information from any master unit or endpoint unit to any other master unit or endpoint unit.

In one specific embodiment of the network of FIG. 1, the network is a fluorescent lamp lighting control network. Each endpoint unit is an RF-enabled replaceable fluorescent lamp starter unit. The starter unit is plugged into an associated fluorescent light fixture. In the diagram of FIG. 1, for example, the rectangle 15 represents the fluorescent light fixture controlled by starter unit 6. Under network control, starter unit 6 is made to turn on a fluorescent lamp of light fixture 15, and is made to turn off the fluorescent lamp 19 of light fixture 15. In the specific embodiment, the group master unit 2 and each of the local master units 3 and 8 includes a battery-powered infrared occupancy detector that involves a Passive InfraRed (PIR) sensor and a multi-section fresnel lens. Using techniques well known in the art, the infrared occupancy detector detects motion of an infrared emitter (for example, a person) in the field of view of the fresnel lens and detects the lack of motion of such infrared emitters. In the specific embodiment, the light fixtures 13-16 associated with the first set of endpoint units 4-7 can be manually turned on using wall switch 17. Toggling wall switch 17 from the OFF position to the ON position causes AC electrical power to be supplied to the light fixtures 13-16. The starter units 4-7 detect this change and respond to the AC power ON condition by turning on their respective fluorescent lamps. Thereafter, if the local master 3 does not detect motion for a predetermined amount of time, then the starter units 4-7 are commanded by local master unit 3 to turn OFF their respective fluorescent lamps. If thereafter motion is again detected by local master unit 3, then local master unit 3 controls the starter units 4-7 to turn their respective fluorescent lamps back on again. The fluorescent lamps can be turned off manually by toggling wall switch 17 to the OFF position, thereby preventing AC electrical power from flowing to the light fixtures and their starter units. If AC power is not supplied to the light fixtures 13-15, then their starter units cannot turn on their respective fluorescent lamps and the lamps remain off.

Figure 4:
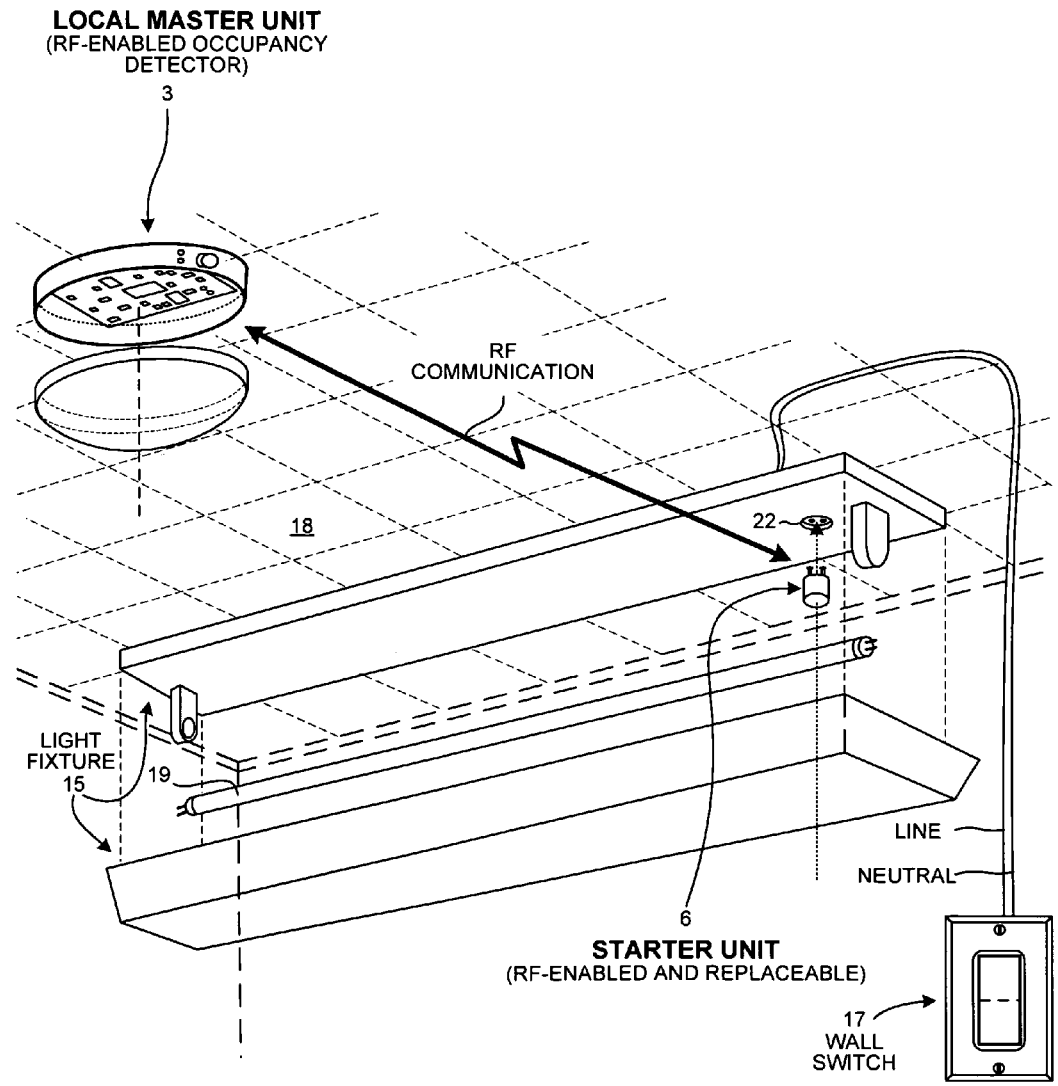
FIG. 4 is a perspective diagram of one of the local master units of the system of FIG. 1 and one of the replaceable RF-enabled starter units of the system of FIG. 1.

FIG. 4 is a perspective diagram of one example of first local master unit 3, of light fixture 15 of the first sub-network, and of wall switch 17. First local master unit 3 and light fixture 15 are attached to the ceiling 18 of a building in this example. Light fixture 15 includes a fluorescent lamp 19 and starter unit 6. Starter unit 6 has two terminals 20 and 21 (see FIG. 6) that can be plugged into an accommodating socket 22 in light fixture 15. The starter unit, the light fixture, the local master, and the wall switch of FIG. 4 are representative of all such components in the larger network of FIG. 1.

Figure 5:
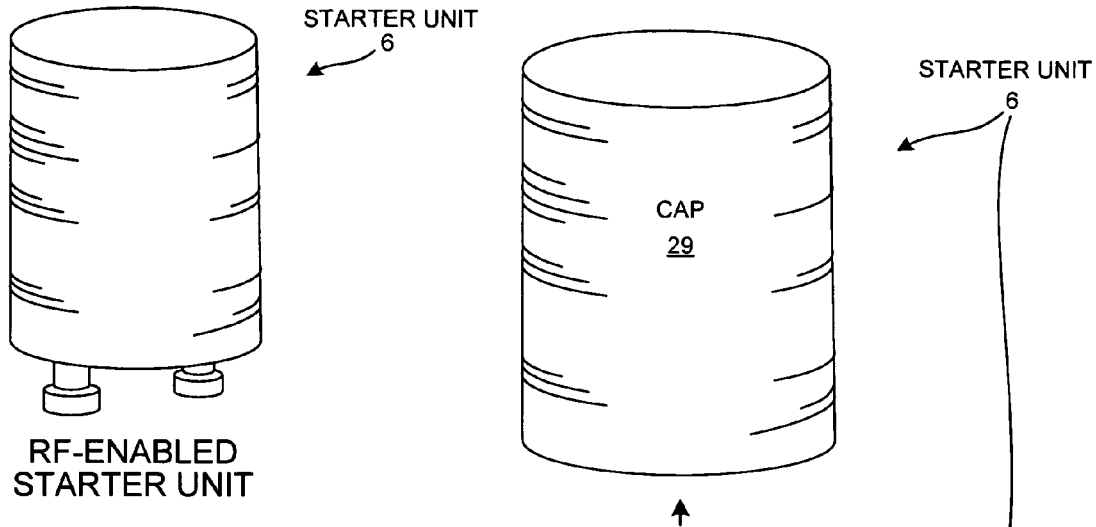
FIG. 5 is a perspective diagram of an RF-enabled starter unit.

FIG. 5 is a perspective view of the RF-enabled starter unit 6 of light fixture 15 of FIG. 4.

Figure 6:
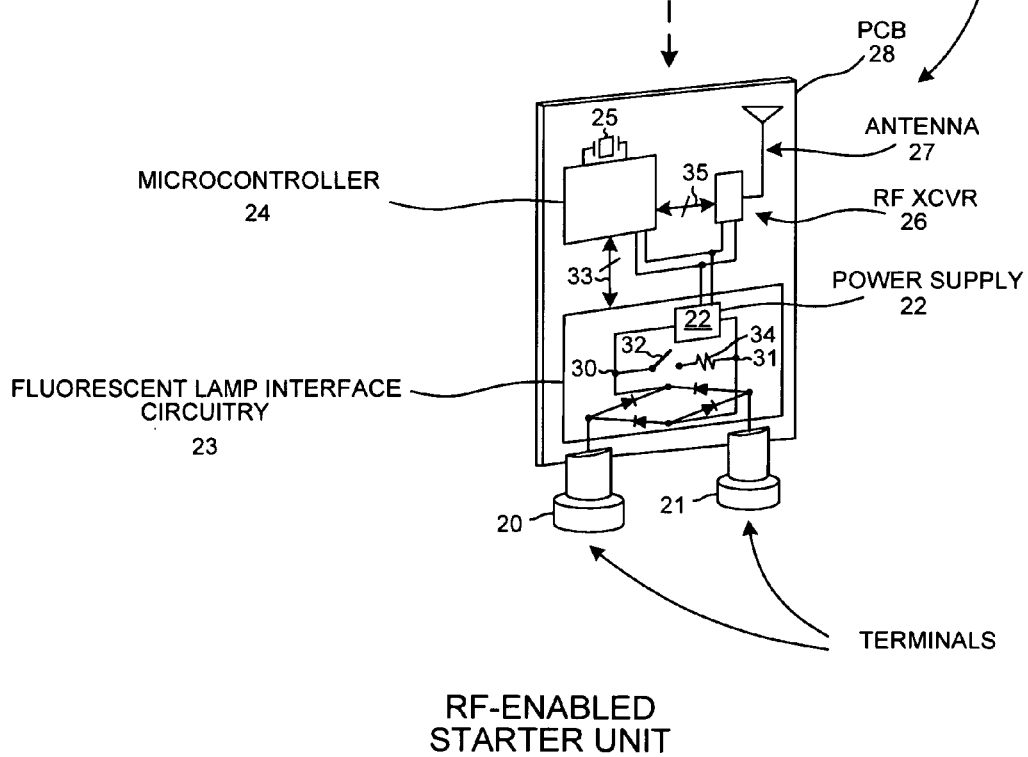
FIG. 6 is an exploded view of the RF-enabled starter unit of FIG. 5.

FIG. 6 is an exploded perspective view of starter unit 6. Starter unit 6 includes the first terminal 20, the second terminal 21, a power supply circuit 22, fluorescent lamp interface circuitry 23, a microcontroller integrated circuit 24, a 32.768 kHz crystal 25, an RF transceiver 26, and an antenna 27. This circuitry is disposed on a printed circuit board (PCB) 28 as illustrated. PCB 28 is disposed within a cylindrical cap 29. Terminals 20 and 21 extend downward through holes in a circular disk-shaped base portion (not shown) of PCB material. The circular edge of this disk-shaped base portion joins with the circular bottom edge of cap 29 and forms a circular bottom of starter unit 6.

Fluorescent lamp interface circuitry 23 includes a full wave rectifier that receives a 230 VAC signal between terminals 20 and 21 and outputs full wave rectified signal between nodes 30 and 31. Power supply circuit 22 receives the full wave rectified signal between nodes 30 and 31 and generates therefrom a direct current (DC) supply voltage VDD used to power microcontroller 24, RF transceiver 26, and interface circuitry 23. Power switch 32 is a switch that is used to turn on, and to turn off, fluorescent lamp 19. Power switch 32 is a power Field Effect Transistor (FET) that is controlled by microcontroller 24 via gate drive circuitry of circuitry 23. Microcontroller 24 drives the gate of switch 32 and controls and monitors the remainder of interface circuitry 23 via signals communicated across conductors 33. Microcontroller 24 monitors and traces the AC voltage waveform between nodes 30 and 31 using an Analog-to-Digital Converter (ADC) that is part of the microcontroller. Microcontroller 24 monitors and traces the waveform of the current flowing through switch 32 by using its ADC to monitor a voltage dropped across a sense resistor 34. Microcontroller 24 uses an on-board comparator and timer to detect and time zero-crossings of the AC signal on terminals 20 and 21. Microcontroller 24 determines when and how to control switch 32 based on the detected AC voltage between nodes 30 and 31, the time of the zero-crossings of the AC signal on terminals 20 and 21, and the magnitude of current flow through switch 32.

Crystal 25 is a 30 ppm (parts per million) accuracy 32.768 kHz crystal that is used to generate an accurate time base for the timer within microcontroller 24. This timer is used not only to monitor the AC voltage waveform on nodes 30 and 31, but it is also used to control and to time other starter unit operations such as the timing of when beacons are transmitted, the timing of when the RF transceiver is placed into the receive mode, and the timing of when the starter unit circuitry is placed into a low-power sleep mode. Execution of instructions by the microcontroller, on the other hand, is clocked by a relatively less accurate 1.3824 MHz clock signal generated by a four percent accuracy internal precision oscillator (IPO) internal to the microcontroller integrated circuit.

Microcontroller 24 communicates with and controls RF transceiver 26 via a bidirectional serial SPI bus and serial bus conductors 35. In one embodiment, microcontroller 24 is a Z8F2480 8-bit microcontroller integrated circuit available from Zilog, Inc., of Milpitas, Calif. Microcontroller 24 includes an amount of non-volatile memory (FLASH memory) that can be written to and read from under software control during operation of starter unit 6. In one embodiment, RF transceiver 26 is a SX1211 transceiver integrated circuit available from Semtech Corporation, 200 Flynn Road, Camarillo, Calif. 93012. Transceiver 26 is coupled to antenna 27 via an impedance matching network (not shown) and a SAW filter (not shown). The SAW filter may, for example, be a B3716 SAW filter available from the Surface Acoustic Wave Components Division of EPCOS AG, P.O. Box 801709, 81617 Munich, Germany. Antenna 20 may, for example, be a fifty ohm 0868AT43A0020 antenna available from Johanson Technology, Inc., 4001 Calle Tecate, Camarillo, Calif. 93012. The RF transceiver operates in a license free frequency band in the 863-878 MHz range (for example, about 868 MHz), in accordance with a reference design available from Semtech Corporation.

Figure 7:
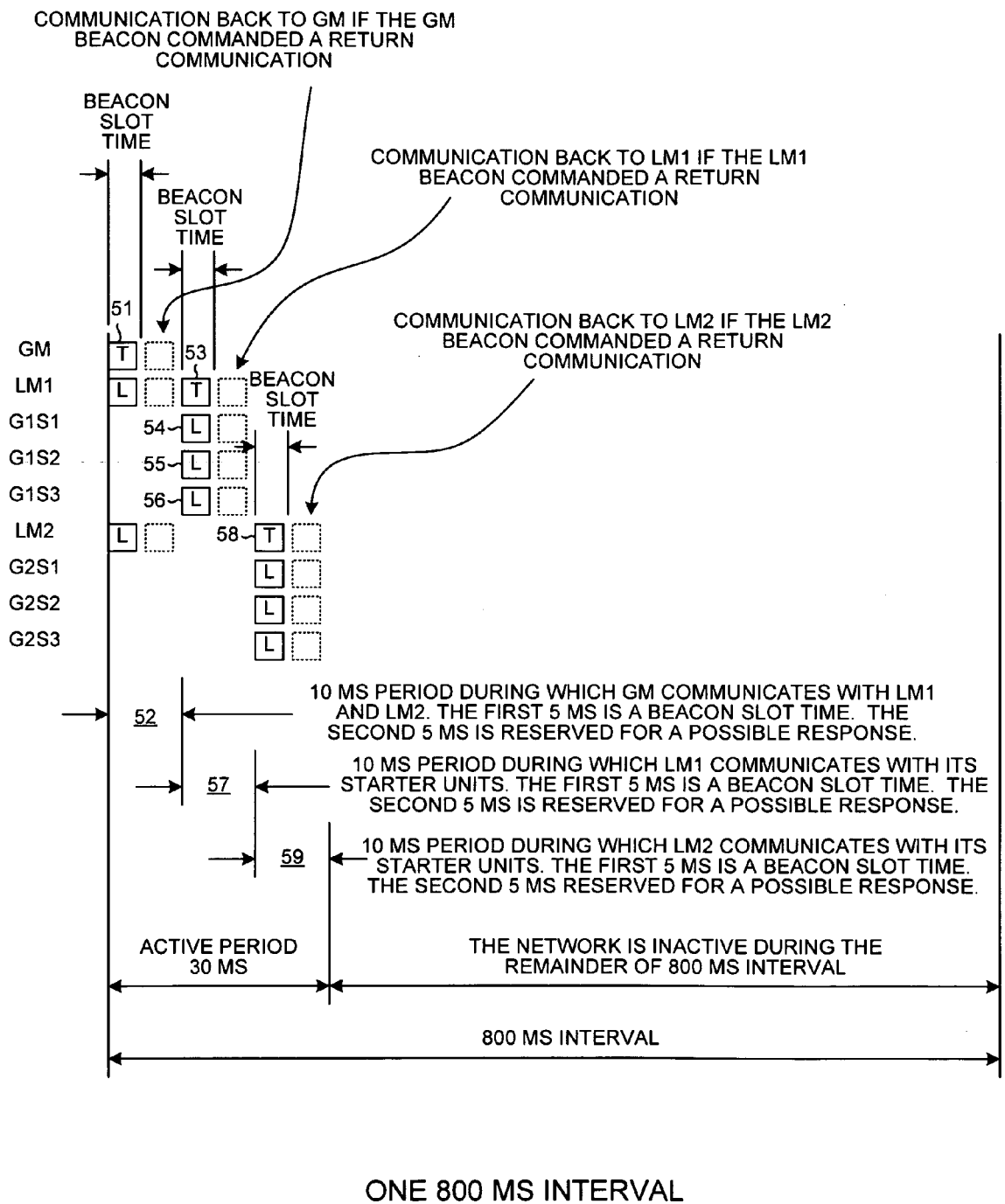
FIG. 7 is a diagram that shows how and when the units of system of FIG. 1 communicate in one 800 ms interval.

FIG. 7 is a diagram that illustrates operation of network 1 of FIG. 1. In the diagram, a box symbol containing a "T" indicates a transmission, whereas a box symbol containing a "L" indicates listening (i.e., receive) operation. Network activity occurs during an initial 30 ms period at the beginning of each 800 ms interval. First, the general master 2 transmits a beacon 51. Local master units LM1 and LM2 receive beacon 51 and use beacon 51 to synchronize themselves to the transmission interval of the beacon. In this example, it takes approximately 6 ms to wake the RF transceiver from its sleep mode and to place the RF transceiver into its transmit mode. Actual beacon transmission occurs for approximately 3 ms although the beacon slot time is 5 ms. If beacon 51 includes a command for another unit to transmit back information, then the other unit transmits the requested information back in the next 5 ms period. If beacon 51 included no command for another unit to transmit back information, then there is no transmission in the next 5 ms period. As illustrated in FIG. 7, group master 2 communicates with the local master units 3 and 8 during the first 10 ms period 52 of the 800 ms interval.

After group master 2 has communicated with the local masters in this way during period 52, then the first local master LM1 transmits its beacon 53 during the next 5 ms beacon slot period. The starter units of the first sub-network synchronize themselves to beacons from the first local master. The boxes 54, 55 and 56 indicate that the RF transceivers of the starter units of the first sub-network are in receive mode and listen for beacon 53 from the first local master unit LM1. As in the case of communication between the group master and the local masters, if beacon 53 included a command for a return communication, then the starter unit identified by the beacon 53 makes a return transmission in the next 5 ms period. Communication between the first local master LM1 and its starter units occurs during the second 10 ms period 57. Alternatively, a local master transmits beacons in beacon slot number given by the least significant bits of the local master's identifying address.

Similarly, the second local master LM2 transmits its beacon 58 during the next 5 ms period beacon slot time. Communication between the second local master unit and its starter units occurs during the third 10 ms period 59. Where the beacon slot time for a particular master falls within each 800 ms interval is predefined and is known to all units in the network.

When an RF transceiver of a unit (master unit or starter unit) is neither to be transmitting nor receiving, then the RF transceiver is disabled and placed into a sleep mode to reduce power consumption. In sleep mode, the RF transceiver consumes only 2 microamperes (uA) of supply current. Although the local master units LM1 and LM2 are both indicated in FIG. 7 as transmitting beacons during the 800 ms interval, it is to be understood that a local master unit in the system of FIG. 1 generally only transmits a beacon once every 256 800 ms intervals. In contrast, the starter units of the sub-network wake-up at the appropriate time each 800 ms interval, put their RF transceivers in to receive mode, and listen for a beacon from their local master unit. If the starter units receive no beacon after listening for a predetermined amount of time, then they disable their RF receivers and return to sleep mode for the remainder of the 800 ms listening interval. It has been found that communication of a beacon once every 256 of the 800 ms intervals is adequate for the starter units to remain in synchronization with their local master unit.

Unless lighting control information or other information must be communicated before the next 256th 800 ms interval has arrived, a local master unit does not transmit a beacon until that time. Whereas an RF transceiver in sleep mode consumes only 2 uA of supply current, the RF transceiver in transmit mode consumes approximately 25 milliamperes (mA). If, however, there is a need for communication to a starter unit, then a local master may elect to transmit a beacon during any of the 800 ms intervals. Starter units therefore are made to wake up and to listen for a beacon during the appropriate beacon slot time of each 800 ms interval. Whereas an RF transceiver in sleep mode consumes only 2 uA of supply current, the RF transceiver in receive mode consumes approximately 3.5 mA.

Figure 8:
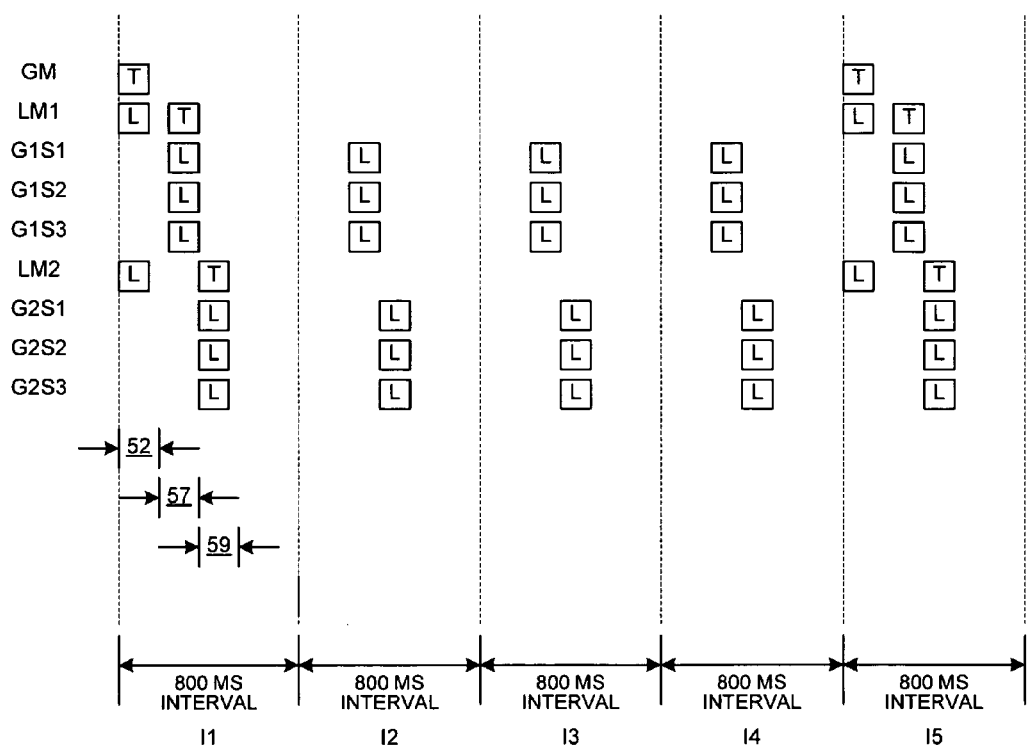
FIG. 8 is a diagram that shows how a local master unit transmits a beacon only during a few of the 800 ms intervals but how the starter units listen for beacons during every 800 ms interval.

FIG. 8 is a diagram that illustrates operation of the network of FIG. 1. The diagram is compressed in the horizontal time dimension with the sleep portions of the 800 ms intervals much compressed so that more 800 ms intervals can be shown in the diagram. The 800 ms intervals are designated with reference numerals I1-I5. In the illustrated example, local master unit LM1 transmits one beacon each fourth 800 ms listening interval. The starter units G1S1, G1S2, and G1S3 of the first sub-network, however, put themselves into receive mode and listen for a beacon during the appropriate beacon slot time every 800 ms interval. If the first local master unit had urgent information to communicate to its starter units, then the first local master unit could transmit a beacon at the appropriate time during the next 800 ms listening interval so that the listening starter units G1S1, G1S2, and G1S3 of the first sub-network would receive the beacon during the next interval. If no such urgent information needs to be communicated, then the first local master unit only must transmit beacons as frequently as is necessary to keep its starter units properly synchronized. Note that in the example of FIG. 8, the second master unit LM2 also transmits beacons to its starter units only once ever four 800 ms intervals. The starter units of the second sub-network, however, listen for beacons from the LM2 local master each 800 ms interval as illustrated.

The group master unit optionally may listen to the beacons from its subordinate local master units. This allows the group master unit to hear a command from a local master that instructs the starter units of the local master unit to turn on/off their lamps. In this way, the group master unit can pass information received from one local master unit to other local master units in the next 800 ms beacon interval.

Figure 9:
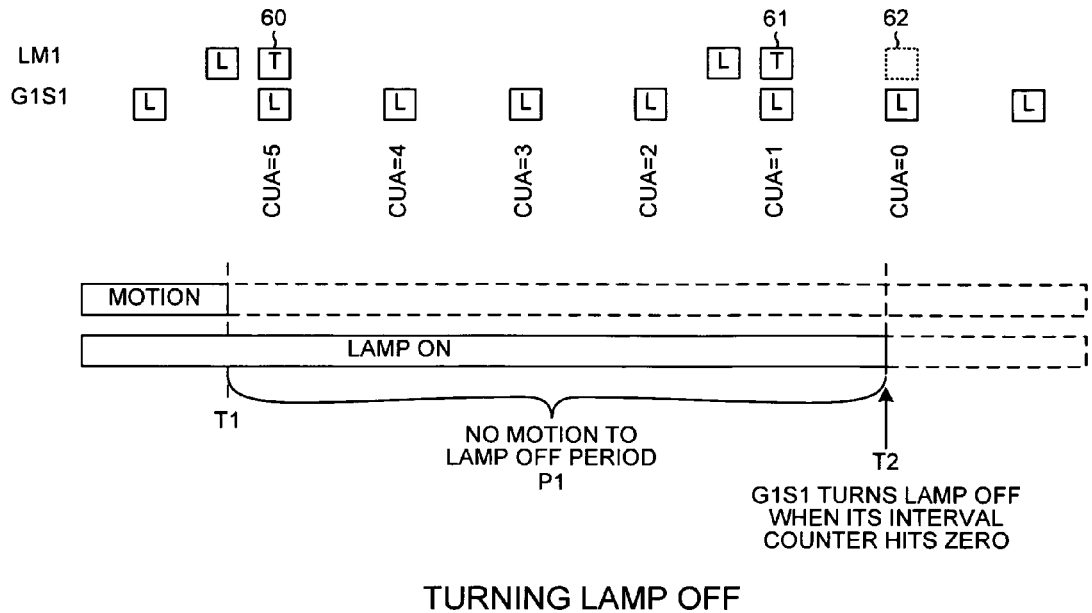
FIG. 9 is a diagram that shows one way that a lamp can be turned off in the system of FIG. 1 using a beacon, where the beacon contains a field (a Count Until Action field or a Time Until Action field). The value of the field determines the future time when the lamp is to be turned off.

FIG. 9 is a diagram that illustrates how a local master unit can cause a starter unit to turn off a lamp. Communication between local master unit LM1 and the group master unit GM is not illustrated in FIG. 8 in order to simplify the diagram. In the illustrated example, the first local master unit LM1 determines at time T1 that there has been no motion in the field of view of the local master unit for a predetermined amount of time. If this condition persists for another predetermined amount of time P1, then the lamps controlled by the first local master unit are to be turned off at time T2. It may be desired that the time from T1 to T2 be more tightly controlled than the relatively large amounts of time between successive beacons of the local master LM1.

In one novel aspect, the command field in the next beacon 60 to be transmitted from local master LM1 has a value that indicates that the lamp controlled by starter unit G1S1 is to be turned off. The count until action field (see FIGS. 2 and 3) has a value of five (CUA=5) indicating that the designated action as indicated by the command (turning the lamp off) is to occur five 800 ms intervals later. As explained above in connection with FIG. 8, the receiving starter unit G1S1 listens for a beacon from its local master once every 800 ms interval. If no beacon is received to refresh or reset its CUA counter, then the listening starter unit G1S1 decrements its interval count value. Note that in the example of FIG. 9, the lamp remains on and the CUA count value as maintained by G1S1 is decremented from four, to three, to two, during the next three 800 ms listening intervals. If the counter were to expire, then the starter unit G1S1 would have taken the designated action and would have turned the lamp off. In the illustrated example, the counter does not reach zero before the local master unit LM1 transmits another beacon 61. In this example, local master unit LM1 sensed no motion from the time of the first beacon until the time of the second beacon. The local master unit LM1 therefore determines that the lamp is still to be turned off five 800 ms intervals after time T1. The second beacon 61 therefore includes a command to turn off the lamp but the Count Until Action field (CUA field) of the second beacon 61 is the same as the interval count maintained by the starter unit. The second beacon 61 therefore has no effect on the interval count within starter unit G1S1. Following the second beacon, one 800 ms interval later, the CUA interval counter in starter unit G1S1 reaches zero. In response to the CUA interval counter reaching zero at time T2, the starter unit G1S1 turns off the lamp. In one advantageous aspect; it is recognized that no special beacon must be communicated from the local master unit to the starter unit at this time in order to cause the lamp to be turned off at the desired time T2. The local master need only transmit beacons with adequate frequency that the starter units remain synchronized to the local master. Had the local master unit detected motion after the time of the second beacon 61 but before the expiration of the interval counter within G1S1, and had the local master unit LM1 therefore determined that the lamp was no longer to be turned off at time T2, then the local master unit LM1 could have transmitted a special beacon 62 in the next 800ms interval and instructed starter unit G1S1 to leave its lamp on. In the example illustrated in FIG. 9, however, local master unit LM1 did not detect such motion and the CUA interval counter within starter unit G1S1 was allowed to count down to zero such that the lamp controlled by starter unit G1S1 was turned off at time T2.

Although the use of the command and count until action fields of a beacon are usable to control when a lamp is turned off in the example above, the turning off of a lamp is but one example of how the command and count until action fields can be used. The command and count until action fields within a beacon have general applicability and are applicable to controlling actions other than controlling lamps.

Figure 10:
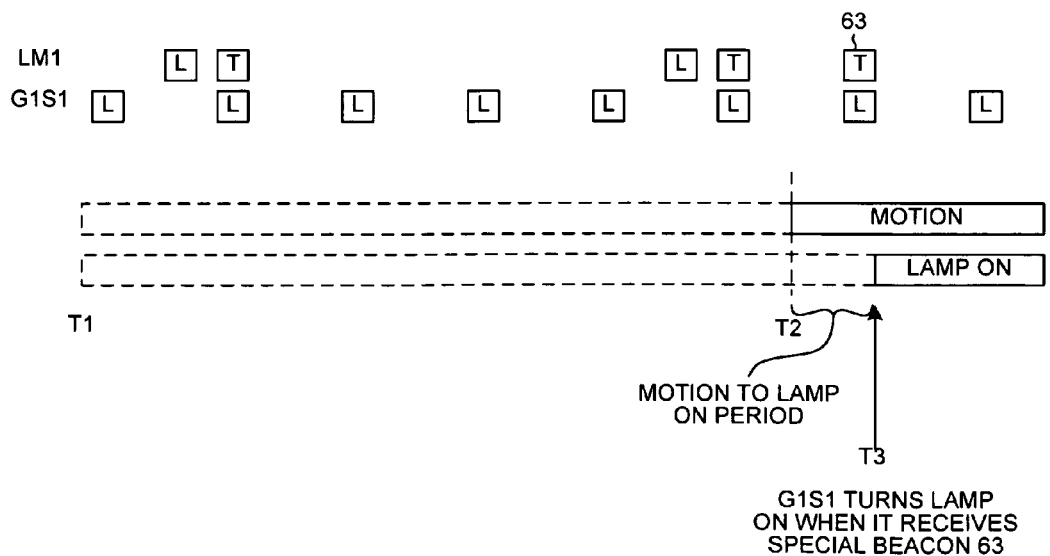
FIG. 10 is a diagram that shows one way that a lamp can be turned on in the system of FIG. 1 by sending a beacon during the next 800 ms interval, where the beacon contains a command to a starter unit to turn on a lamp associated with the starter unit.

FIG. 10 is a diagram that illustrates how local master unit LM1 can cause starter unit G1S1 to turn on its lamp in response to master unit LM1 detecting motion. In the example of FIG. 10, from time T1 to time T2 the local master unit LM1 does not detect motion. From a time previous to time T1, the starter unit has kept its lamp turned off. Local master unit LM1, however, continues to transmit beacons every fourth 800 ms interval in order to keep its starter units, including starter unit, G1S1 synchronized to the beacons. As explained above in connection with FIG. 8, starter unit G1S1 wakes up at the appropriate time each 800 ms interval, enables its RF transceiver, and listens for a beacon. During most intervals, no beacon is transmitted or received. The starter unit G2S1 returns to its sleep mode for the remainder of the 800 ms interval. In the illustrated example, local master unit LM1 detects motion at time T2 and determines that the lamp controlled by starter unit G1S1 is to be turned on. On the very next 800 ms interval, the local master unit LM1 transmits a beacon 63. Starter unit G1S1, that is listening for such a beacon, receives the beacon 63. The command field of this beacon 63 contains a value for turning on the lamp. The Count Until Action field contains a zero value, meaning that the action of turning on the lamp is to occur immediately. The lamp is therefore turned on upon receiving of the beacon 63 at time T3. Although beacons are generally sent at widely spaced intervals only as often as required to maintain synchronization, when an action (such as turning on of a lamp) is to be initiated as soon as possible a local master unit can transmit a special beacon 63 in the very next 800 ms interval.

This special beacon can include a command that causes the action to be initiated immediately upon receipt of the special beacon by a starter unit.

Figure 11:
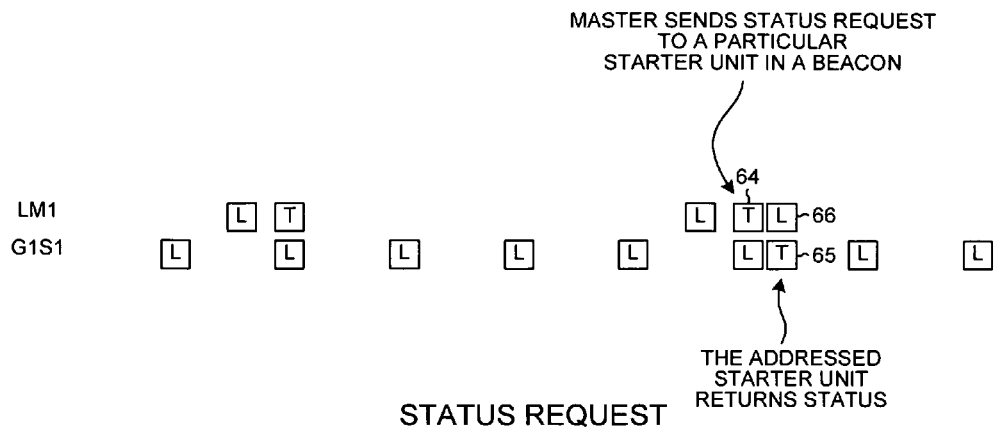
FIG. 11 is a diagram that shows how a local master unit in the system of FIG. 1 can command a particular starter unit to return status information to the local master unit.

FIG. 11 is a diagram that illustrates how a local master unit can instruct a particular starter unit to transmit back particular information to the local master unit. The local master unit transmits synchronizing beacons in ordinary fashion. The starter units put their RF transceivers into receive mode once each 800 ms interval to listen for beacons in predetermined beacon slot times in ordinary fashion. In the example of FIG. 11, however, one of the synchronizing beacons 64 includes a value in the command field that instructs the starter unit addressed by the value in the Command Target Address (CTA) field to report status back to the local master unit. Accordingly, after the 5 ms period beacon slot time which the beacon 64 is transmitted, the addressed starter unit G1S1 switches its RF transceiver from the receive mode to the transmit mode. At this same time, the local master unit LM1 that issued the status request beacon 64 also switches its RF transceiver from the transmit mode to the receive mode. The starter unit G1S1 then transmits the requested information back to the local master unit in the next 5 ms period. The box containing the "T" 65 indicates the transmission by the starter unit. The box containing the "L" 66 indicates the listening by the local master unit LM1 and the receipt of the status information.

In one example, the requested information is information indicative of the remaining usable life of the lamp. As a fluorescent lamp ages and wears out, the number of ignition attempts required to successfully start the lamp generally increases. A young lamp generally is successfully started on the first ignition attempt, whereas an aged lamp that requires replacing may require ten or more ignition attempts before it is started. Each starter unit of the network of FIG. 1 maintains a count of the number of ignition attempts required to start its respective fluorescent lamp. The status information reported in response to beacon 64 in FIG. 11 may be such lamp ignition attempt information and/or other lamp aging/wear information. The local master units of the network can query the starter units one by one for this aging information, and can exchange and share information on which lamps of the system require replacing.

Synchronization:

The master and starter units are operable in three high-level modes of operation: a synchronization mode, a registration mode, and a normal operation mode. The description above of the group master, local masters, and starter units communicating with one another in synchronized fashion such as shown in FIG. 7 using beacons and commanded responses is operation in the normal operation mode. Registration mode operation occurs before a starter unit can synchronize and communicate with a master unit.

Registration involves associating each starter unit to a local master such that the starter unit will thereafter not erroneously respond and be controlled by wireless communications from sources other than the properly associated local master. As a result of the registration process, a properly registered starter unit stores registration information in non-volatile memory of the microcontroller of the starter unit. This registration information includes an identifier that identifies the particular starter unit, an identifier that identifies the master that is to control and communicate with the starter unit, and a value indicating the interval format.

If a starter unit powers up and detects that it stores valid registration information, then the starter unit determines that it must not be properly synchronized. The starter unit enters the synchronization mode. In the synchronization mode, the RF transceiver of the starter unit is placed into the receive mode to listen for a beacon. The synchronization mode listening window is 19 ms and is longer than the ordinary 5 ms listening window used in normal mode operation. If a beacon is received, then the starter unit uses the detected time of the onset of the beacon to reset an interval timer. This interval timer is a hardware timer, that is clocked to a clock signal generated by the 32.768 Hz 30 ppm crystal, and that is used by microcontroller software to identify where current time is in the current interval. Once the microcontroller knows where current time is in the current interval, the microcontroller uses its knowledge of the interval format to determine how long to operate in sleep mode and when to wake up and place the RF transceiver into receive mode in time for the next beacon slot time.

If a beacon is not received after listening for one 19 ms synchronization mode listing window, then the microcontroller slides the 19 ms slot time with respect to the duration of the interval such that the next time the starter unit wakes and listens for a beacon the synchronization mode listening window will occur at a different time with respect to the 800 ms interval. As the 19 ms listening windows slide across the interval period from interval to interval, the starter unit eventually receives a beacon and synchronizes itself to the beacon by setting its interval hardware timer as described above. Once synchronized, the starter unit switches to operate in normal mode.

Figure 12:
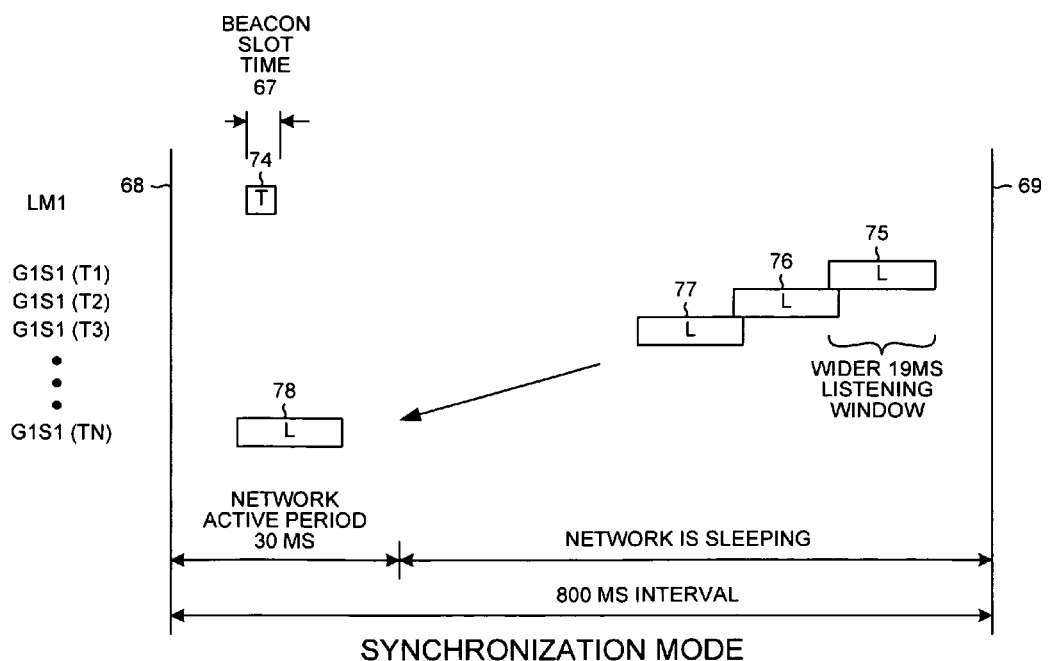
FIG. 12 is a diagram that shows how a unit in the system of FIG. 1 can synchronize itself to another unit that is transmitting a beacon.

FIG. 12 is a diagram that illustrates synchronization mode operation of starter unit G1S1. If a beacon from local master LM1 is present in a 800 ms interval, then it would be present at beacon slot time 67 with respect to the start time 68 and end time 69 of the interval. A beacon 74 is shown in FIG. 12 to represent such a possible beacon. From interval to interval, the starter unit slides the 19 ms listening window with respect to the interval. This sliding is represented by the sequence of listening windows 75, 76, 77 and 78. Eventually a listening window, listening window 78 in this case, overlaps a beacon such that the starter unit receives the beacon. Due to beacons being transmitted very seldom at a rate of one every 3.41 minutes (a local master operating in normal mode), synchronization may require a substantial amount of time. If the starter unit is aware of the interval format, then the starter unit is not limited to synchronizing itself to beacons originating from its local master, but rather the starter unit can synchronize itself using a beacon originating from another master. To speed synchronization, the transceiver of the starter unit can be left on longer than the example time of 19 ms or simply left in listening mode continuously to listen for a beacon for up to 3.41 minutes until a beacon is detected.

RF Transceiver Control:

RF transceiver 26 typically consumes 25 mA of supply current when in transmit mode and transmitting at +10 dBm. In the receive mode, the transceiver consumes approximately 3 mA of supply current. In sleep mode, the transceiver consumes about 2 uA of supply current. To wake the transceiver from sleep mode, the microcontroller 24 places the transceiver into a "standby mode". This process takes about 5 ms, and during this time power consumption of the transceiver increases from 2 uA to 80 uA. The microcontroller then sets the transceiver to the correct communication frequency. This process takes up to 800 microseconds (us) and during this time transceiver power consumption increases from 80 uA to 1.7 mA. Microcontroller 24 then places transceiver 26 into the active receive mode. This process takes about 500 us and during this time transceiver power consumption increases from 1.7 mA to about 3 mA. The total amount of time required to wake up the transceiver from sleep mode therefore takes about 6.6 ms. During this wake up time, the microcontroller does not remain in a fully active mode. The microcontroller consumes about 1.4 mA in the fully active mode. Instead, microcontroller 24 issues commands to transceiver 26 across bus 35 and then sets a hardware times and returns to a low power mode. In the low power mode the microcontroller consumes 25 uA of supply current. When the hardware timer expires, the microcontroller is revived out of the low power mode, issues the next command the transceiver, sets the hardware timer again, and returns to the low power mode. In this way, the microcontroller is in the low power mode during most of the wake up sequence of the transceiver.

Once the transceiver is in the receive mode, microcontroller 24 waits 5 ms for the transceiver to forward the start of a beacon. The microcontroller times the wake up sequence such that the transceiver is placed into the receive mode about 2 ms before the expected start of the beacon slot time. This allows for some drift between the timer clock of the master unit that transmits beacons and the timer clock of the starter units that receive the beacons. At the end of the 5 ms listening window, the microcontroller may not have received a beacon from the transceiver but the transceiver may nonetheless be in the process of receiving a late-received beacon. The microcontroller therefore, before going back to sleep, checks to see if the transceiver is in the process of receiving a beacon. If the transceiver reports that it is still receiving a beacon, then the microcontroller keeps the transceiver in the listening mode for another 2 ms. If the transceiver reports that it is not receiving a beacon, then the microcontroller puts the transceiver into its low power sleep mode.

The local masters include the same microcontroller and transceiver circuitry as the starter units do. Motion detection is performed by the masters using an additional low power dedicated microcontroller and sensor and lens. This sensing microcontroller is always active and sensing motion is relatively continuous. If the motion detect microcontroller detects motion, it asserts a motion detect signal for more than 800 ms. The microcontroller 24 receives this motion detect signal and takes appropriate action. Because the motion detect signal is asserted for more than 800 ms, the microcontroller 24 can sample this signal discretely and briefly when the microcontroller is active during the 800 ms interval. When motion is detected, there is 800 ms worst case latency to turning on the lamps of the sub-network of 800 ms because the local master can only transmit beacons once each 800 ms interval.

Figure 13:
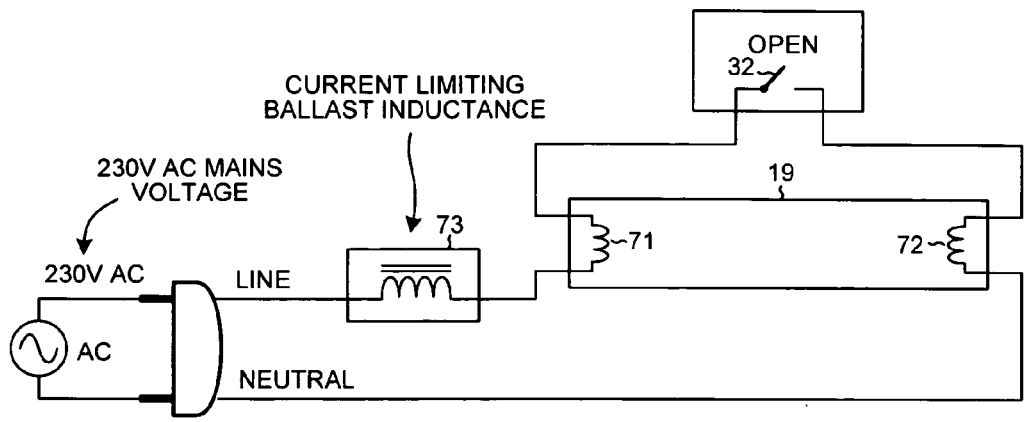

Lamp Ignition and Turn Off:

FIGS. 13-16 illustrate how a starter unit can turn on a fluorescent lamp. FIG. 13 shows an initial condition in which lamp 19 is off. Switch 32 is open, and no current flows through the lamp.

Figure 14:
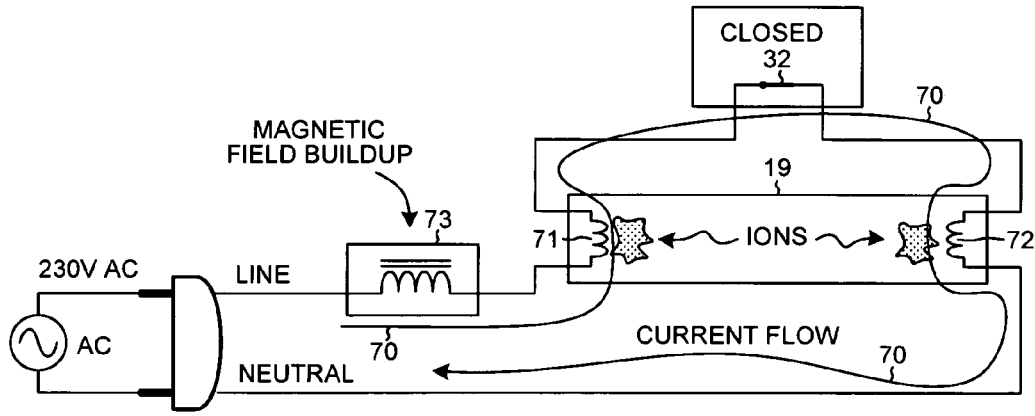

FIG. 14 shows a first step in the process of turning on lamp 19. Switch 32 is closed, thereby causing current flow 70. The filaments 71 and 72 heat, and a magnetic field builds in a ballast inductance 73.

Figure 15:
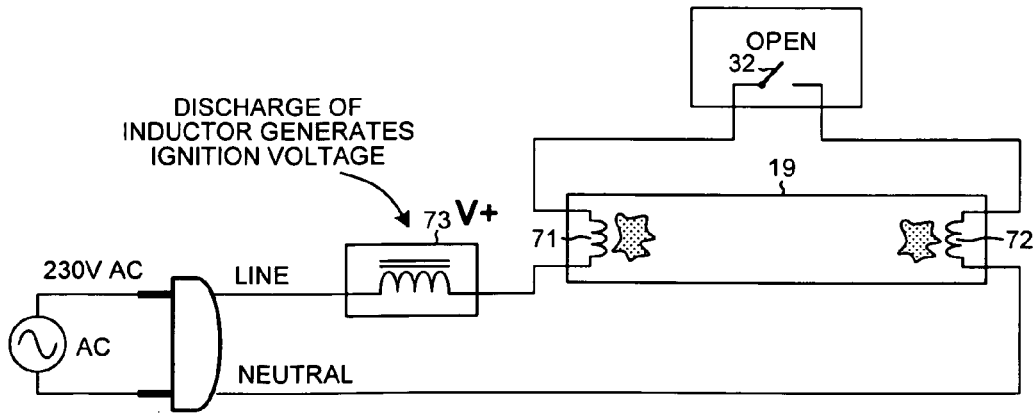

FIG. 15 shows a second step in the process of turning on the lamp. Switch 32 is opened. The collapsing magnetic field in inductance 73 causes a large voltage to develop across the inductance 73 and between the filaments 71 and 72.

FIG. 16 shows a third step in the process of turning on the lamp. The large voltage developed across the inductance 73 is present between the filaments 71 and 72 of the lamp. This voltage causes an arc to form through gas within the lamp. Once the arc forms, the resistance between the two filaments drops, and continued current flow is possible. The continued AC current flow continues to keep the filaments hot such that the arc is maintained and current flow continues. The fluorescent lamp is then on and switch 32 remains open.

FIGS. 17-20 illustrate how a starter unit can turn off a fluorescent lamp. Initially, fluorescent lamp 19 is on and the circuit is in the on state illustrated in FIG. 16. Next, switch 32 is closed as illustrated in FIG. 17. Due to switch 32 being closed, current stops flowing through lamp 19 but rather flows through closed switch 32. The arc through the lamp is stopped. Current, however, continues to flow through filaments 71 and 72 and the filaments continue to be heated. Switch 32 can only remain closed in this condition for a short amount of time as explained above or the switch will become overheated and will be destroyed.

Figure 19:
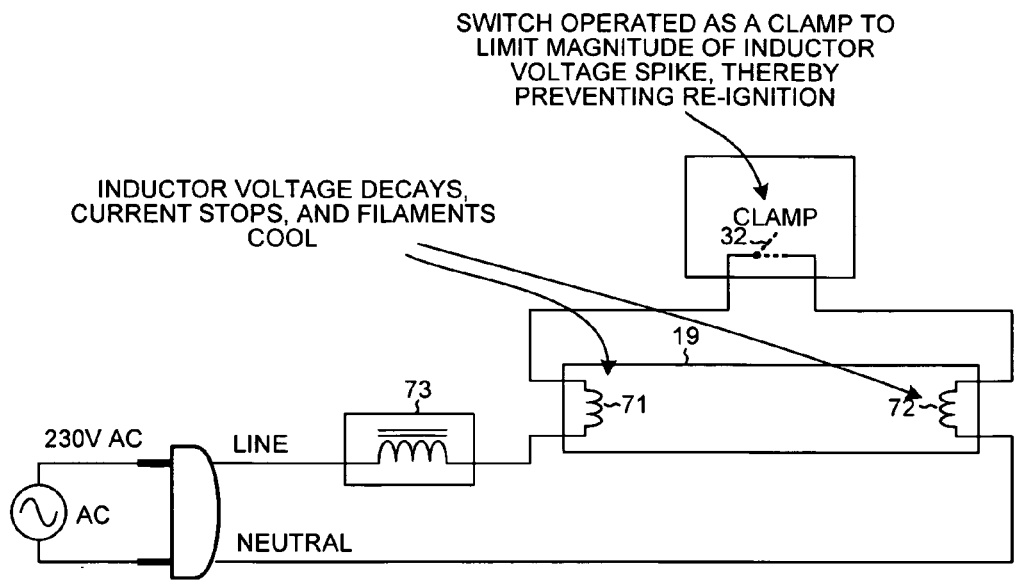
Figure 20:
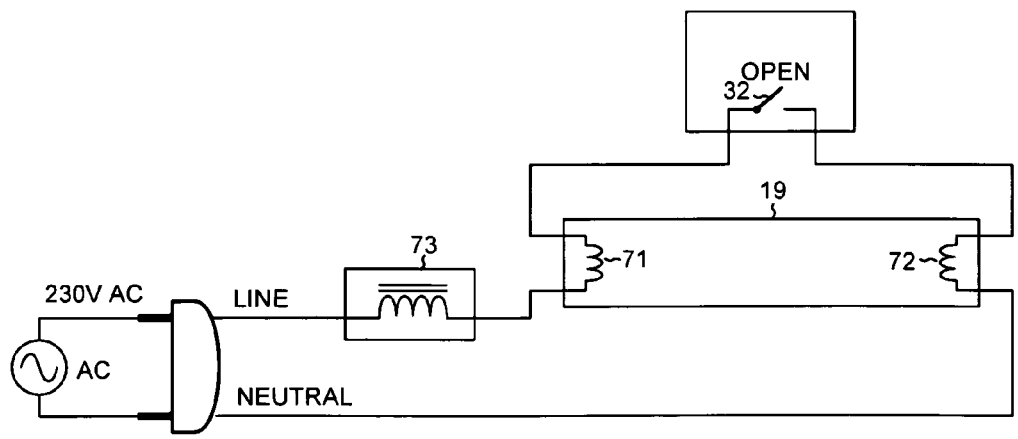

Next, as illustrated in FIG. 18, switch 32 is opened. The cutting of current flow through inductance 73 causes a voltage to start to develop across inductance 73, but before the voltage can increase to the point that an arc is ignited through lamp 19, switch 32 is made to operate as a voltage clamp to limit the magnitude of the voltage spike. Clamp operation of switch 32 is represented in FIG. 19 by showing switch 32 in dashed lines. Due to the clamping action of switch 32, the voltage across inductance 73 is not high enough to ignite an arc through lamp 19, and energy stored in a magnetic field in inductance 73 is dissipated. After enough of the energy stored in inductance 73 has been dissipated and after filaments 71 and 72 have stopped ionizing gas to an adequate degree, then switch 32 is opened on a constant basis without igniting an arc. This condition is illustrated in FIG. 20. There is no current flow, and the filaments 71 and 72 begin to cool. The fluorescent lamp is then said to be in the off condition.

Another Beacon Format

Any one of multiple different beacon formats can be used to initiate a future action in accordance with the teachings of this patent document. The beacon format described above is just one example. In another example, a starter unit has a defined default state. The default state may, for example, be a state in which a lamp controlled by the starter unit is controlled to be off. Beacons are of the format of FIGS. 2 and 3 except that the CUA, CMD, CTA and DAT fields are optional. The value in the LEN field is usable by a receiving starter unit to determine when the beacon includes the optional fields, or whether the beacon is a minimal length beacon and does not include any optional fields. A beacon only used for synchronization purposes does not involve the optional fields. These beacons do not change the state of the starter units.

Consider an example in which the lamps are on and are to be on with an intensity determined by the value in the DAT field of a previous beacon. Once such a non-default state has been established in the starter units, subsequent short beacons are transmitted and used for synchronization purposes. These synchronization beacons are short and do not have the optional fields and do not change the states of the starter units. Then, when a "no motion" condition is detected by a local master such that the lamps are to be turned off, the local master broadcasts a beacon having a CUA value and having a DAT value. The DAT value, which indicates the intensity of the lamp when the lamp is on, is the same DAT intensity value as previously established in the starter units. The lamps therefore continue to be controlled to be on and continue to be controlled to be on with the same intensity. The CUA field value of the broadcast beacon, however, is non-zero. After receiving the broadcast beacon, from interval to interval, the starter units count down from their initial CUA values. In each starter unit, when the CUA counter reaches zero, the starter unit switches from the non-default state (lamp on) to the default state (lamp off). The CUA field in this example therefore holds a count value that is a "count until the starter unit returns to the default state." In some embodiments, the starter units maintain real time counters, and the CUA field contains a time stamp. When a starter unit detects that the real time (as determined by its real time counter) is equal to the time stamp value received in the CUA field of a prior beacon, then the starter unit returns to the default state.

In this alternate beacon format example, sending a beacon having a DAT intensity value greater than zero immediately causes any addressed starter units to turn their lamps on with the intensity indicated. A special CMD field value is not necessary to indicate that the beacon is instructing starter units to turn their lamps on. Beacons can address starter units by including the address of a particular starter unit in the CTA field, or by providing a broadcast address value in the CTA field that addresses a group of starter units. Commands indicated by the CMD field include: 1) an override ON command (this command ignores and does not use values in the CUA and DAT fields), 2) an override OFF command (this command ignores and does not use values in the CUA and DAT fields), 3) a "go into registration mode" command, 4) a report status command, 5) a "go into normal mode" command that takes a starter unit out of an override mode such that the starter unit returns to using the CUA and DAT fields, and 6) a "change default state" command whose DAT field contains information that changes the default state of an addressed starter unit.

Figure 21:
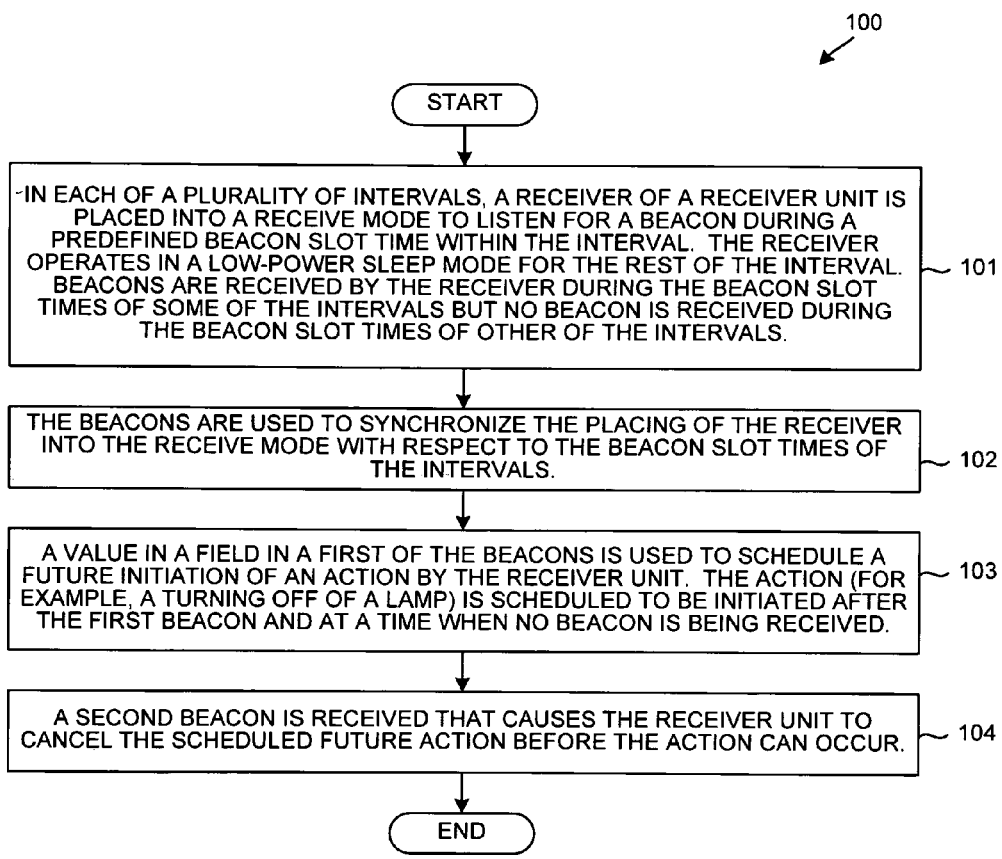
FIG. 21 is a flowchart that illustrates a method involving a first beacon having a field (for example, a Count Until Action CUA field), where the value in the field is used to schedule a future turn off of a fluorescent lamp by a particular starter unit, and where a second beacon is used to cancel the scheduled turn off with reduced latency.

FIG. 21 is a flowchart of a method 100 involving a receiver unit. In one example of the method, the receiver unit is a fluorescent lamp starter unit. Each of a plurality of intervals involves a beacon slot time. A beacon is received onto the receiver unit during slot times of some of the intervals but no beacon is received onto the receiver unit during slot times of other of the intervals. The receiver unit is placed into a receive mode (step 101) so that it is listening for a beacon during each beacon slot time, regardless of whether a beacon is actually received in the beacon slot time or not. After the beacon slot time the receiver unit operates in a low-power sleep mode for the remainder of the interval. The beacons are used (step 102) to synchronize the placing of the receiver into the receive mode with respect to the beacon slot times of the intervals. A value in a field of one of the beacons (a first beacon) is used (step 103) to schedule a future initiation of an action by the receiver unit. The action is scheduled to be initiated after the first beacon and at a time when no beacon is being received. In one example, beacons occur once every 256 intervals, but the action is scheduled to be initiated at a time between these widely spaced beacons. The action may, for example, be the turning off of a fluorescent lamp controlled by the receiver unit.

Rather that having to wait until the next widely spaced beacon to send a command to a receiver unit to cause the receiver unit to take some action, a commanding beacon can be sent to the receiver unit and can be received in the beacon slot time of the next interval after a decision has been made to cause the receiver unit to take the action. In one example, a local master detects motion and in response transmits a beacon to the receiver unit during the beacon slot time in the next interval. The beacon includes a command that instructs the receiver unit to take the desired action. In one possible scenario of the method 100 of FIG. 21, a local master that transmits the beacons of step 101 detects motion after having scheduled a future turning off of a lamp in step 103. Before the time of the scheduled lamp turn off, the local master sends a second beacon (step 104) in the next possible interval and this second beacon cancels the scheduled future action. The lamp therefore remains on. In none of the steps of the method of FIG. 21, does the starter unit make any transmission. A starter unit only makes a transmission is specifically commanded to by a beacon.

Although certain specific embodiments are described above for instructional purposes, the teachings of this patent document have general applicability and are not limited to the specific embodiments described above. The beacon slot times need not be in the same time location in each interval, but rather in one embodiment the time locations of the beacon slot times are varied in a pseudo-random time-hopping fashion from interval to interval. Accordingly, various modifications, adaptations, and combinations of various features of the described embodiments can be practiced without departing from the scope of the invention as set forth in the claims.

What is claimed is:

1. A method comprising:
    (a) in each of a plurality of intervals placing a receiver of a receiver unit into a receive mode, and then listening for a beacon during a predefined beacon slot time within the interval, and placing the receiver into a low-power sleep mode for substantially all the rest of the interval, wherein beacons are received by the receiver during the beacon slot times of some of the intervals but wherein no beacon is received during the beacon slot times of other of the intervals;
    (b) using the beacons received in (a) to synchronize the placing of the receiver into the receive mode with respect to the beacon slot times of the intervals; and
    (c) using a value in a field in one of the beacons to schedule a future initiation of an action by the receiver unit, wherein the action is scheduled to be initiated after said one beacon at a time when no beacon is being received, wherein (a), (b) and (c) are carried out by the receiver unit, wherein the receiver unit includes a transmitter, wherein the receiver unit does not transmit from its transmitter unless being first commanded to by a beacon that includes a command, wherein the action is a turning off of a fluorescent lamp, and wherein the receiver unit is a fluorescent lamp starter unit.

2. The method of claim 1, further comprising:
    (d) initiating a turning on of the fluorescent lamp in response to a receiving of another of the beacons.

3. The method of claim 2, wherein said one of the beacons in (c) includes a second field, and wherein a value of the second field identifies the action.

4. The method of claim 3, wherein the field in step (c) used to schedule the initiation of the action is a number of the intervals.

5. A method comprising:
    (a) in each of a plurality of intervals placing a receiver of a receiver unit into a receive mode, and then listening for a beacon during a predefined beacon slot time within the interval, and placing the receiver into a low-power sleep mode for substantially all the rest of the interval, wherein beacons are received by the receiver during the beacon slot times of some of the intervals but wherein no beacon is received during the beacon slot times of other of the intervals;
    (b) using the beacons received in (a) to synchronize the placing of the receiver into the receive mode with respect to the beacon slot times of the intervals;
    (c) using a value in a field in one of the beacons to schedule a future initiation of an action by the receiver unit, wherein the action is scheduled to be initiated after said one beacon at a time when no beacon is being received, wherein (a), (b) and (c) are carried out by the receiver unit, wherein the receiver unit includes a transmitter, and wherein the receiver unit does not transmit from its transmitter unless being first commanded to by a beacon that includes a command, and (d) transmitting the beacons from an occupancy detector, wherein the occupancy detector detects an absence of motion for a period of time and in response transmits said one of the beacons in (c), wherein the action scheduled in (c) is a turning off of a fluorescent lamp, and wherein the receiver unit is a fluorescent lamp starter unit.

6. The method of claim 5, wherein the receiver unit includes a transmitter, and wherein the receiver unit does not transmit from its transmitter unless commanded to by the occupancy detector.

7. A method comprising:
(a) in each of a plurality of intervals placing a receiver of a receiver unit into a receive mode, and then listening for a beacon during a predefined beacon slot time within the interval, and placing the receiver into a low-power sleep mode for substantially all the rest of the interval, wherein beacons are received by the receiver during the beacon slot times of some of the intervals but wherein no beacon is received during the beacon slot times of other of the intervals;
(b) using the beacons received in (a) to synchronize the placing of the receiver into the receive mode with respect to the beacon slot times of the intervals;
(c) using a value in a field in one of the beacons to schedule a future initiation of an action by the receiver unit, wherein the action is scheduled to be initiated after said one beacon at a time when no beacon is being received, wherein (a), (b) and (c) are carried out by the receiver unit, wherein the receiver unit includes a transmitter, and wherein the receiver unit does not transmit from its transmitter unless being first commanded to by a beacon that includes a command; and
(d) after the scheduling of (c) receiving another beacon onto the receiver unit, wherein said another beacon cancels the scheduling of the initiation of the action before the action can occur, wherein the receiver unit is a fluorescent lamp starter unit, wherein the action scheduled in (c) is a turning off of a fluorescent lamp, and wherein the scheduling is canceled in (d) before the fluorescent lamp is turned off.

8. The method of claim 7, further comprising:
(e) detecting motion on an occupancy detector and during the beacon slot time of the next interval transmitting a third beacon from the occupancy detector to the receiver unit, wherein the third beacon causes the receiver unit to turn on the fluorescent lamp.

9. A system comprising:
an occupancy detector that transmits a plurality of beacons, wherein each beacon is transmitted in a beacon slot time of a respective one of a plurality of intervals, wherein each beacon slot time has a predetermined location within a corresponding one of the intervals, wherein the occupancy detector transmits no beacon in some beacon slot times of some of the intervals but does transmit beacons in beacon slot times of other ones of the intervals; and
a fluorescent lamp starter unit that receives the beacons and uses the beacons to synchronize the placing of a receiver of the fluorescent lamp starter unit into a receive mode with respect to the beacon slot times of the intervals, wherein the receiver is placed into the receive mode during the beacon slot time of every one of the plurality of intervals, wherein the fluorescent lamp starter unit uses a value in a field of one of the beacons to schedule a future initiation of an action by a fluorescent lamp to which the fluorescent lamp starter unit is attached.

10. The system of claim 9, wherein the action is a turning off of a fluorescent lamp by the fluorescent lamp starter unit.

11. The system of claim 10, wherein a magnitude of the value determines a magnitude of time after said one of the beacons until the lamp is turned off.

12. The system of claim 9, wherein the fluorescent lamp starter unit does not transmit any signal to the occupancy detector unless it is first commanded to by the occupancy detector.

13. A fluorescent lamp starter unit comprising:
a Radio Frequency (RF) transceiver that receives a beacon; and
means for using a value in a field of the beacon to schedule a future turning off of a fluorescent lamp by the fluorescent lamp starter unit, wherein a magnitude of the value determines a magnitude of time after the beacon is received until the fluorescent lamp starter unit is to turn off the fluorescent lamp.

14. The fluorescent lamp starter unit of claim 13, wherein the means is also for using beacons to synchronize times when the RF transceiver is in a receive mode so that the times when the RF transceiver is in the receive mode coincide with times when the beacons occur.

15. The fluorescent lamp starter unit of claim 13, wherein the means is also for controlling the fluorescent lamp starter unit such that the fluorescent lamp starter unit does not use its RF transceiver to transmit unless the fluorescent lamp starter unit is first commanded to by a beacon.

* * * * *